L. C. DUNCAN.
SPEED INDICATOR.
APPLICATION FILED OCT. 29, 1912.
1,092,828.
Patented Apr. 14, 1914.
2 SHEETS—SHEET 1.
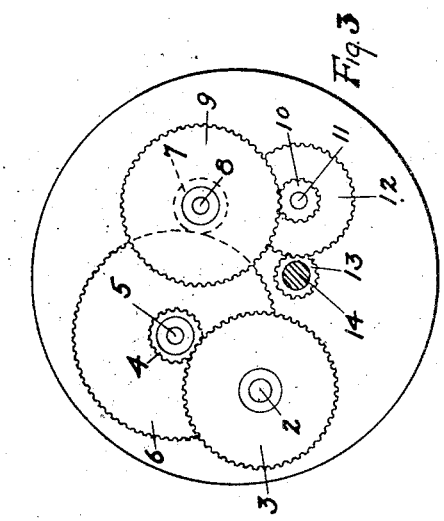
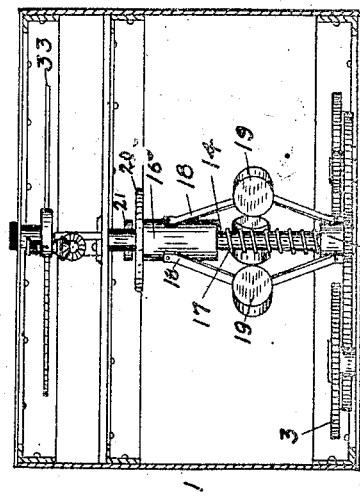
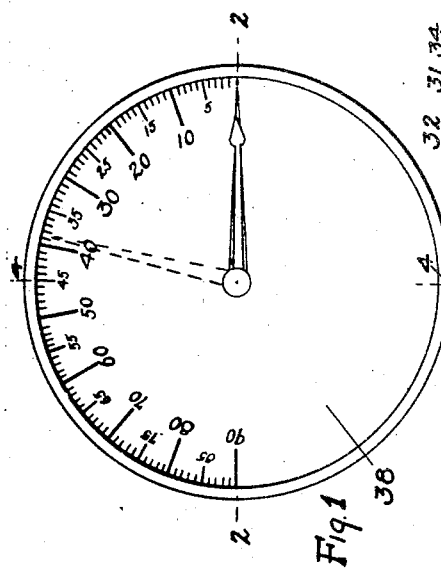
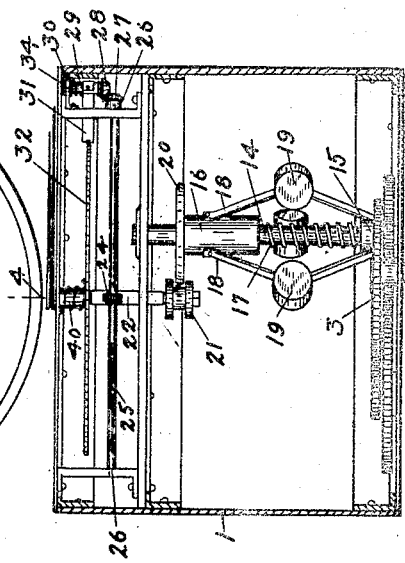
WITNESSES
Harold E. Saunsbury
Paul B. Warren
INVENTOR
Lester C. Duncan
BY
Herbert E. Smith
his ATTORNEY

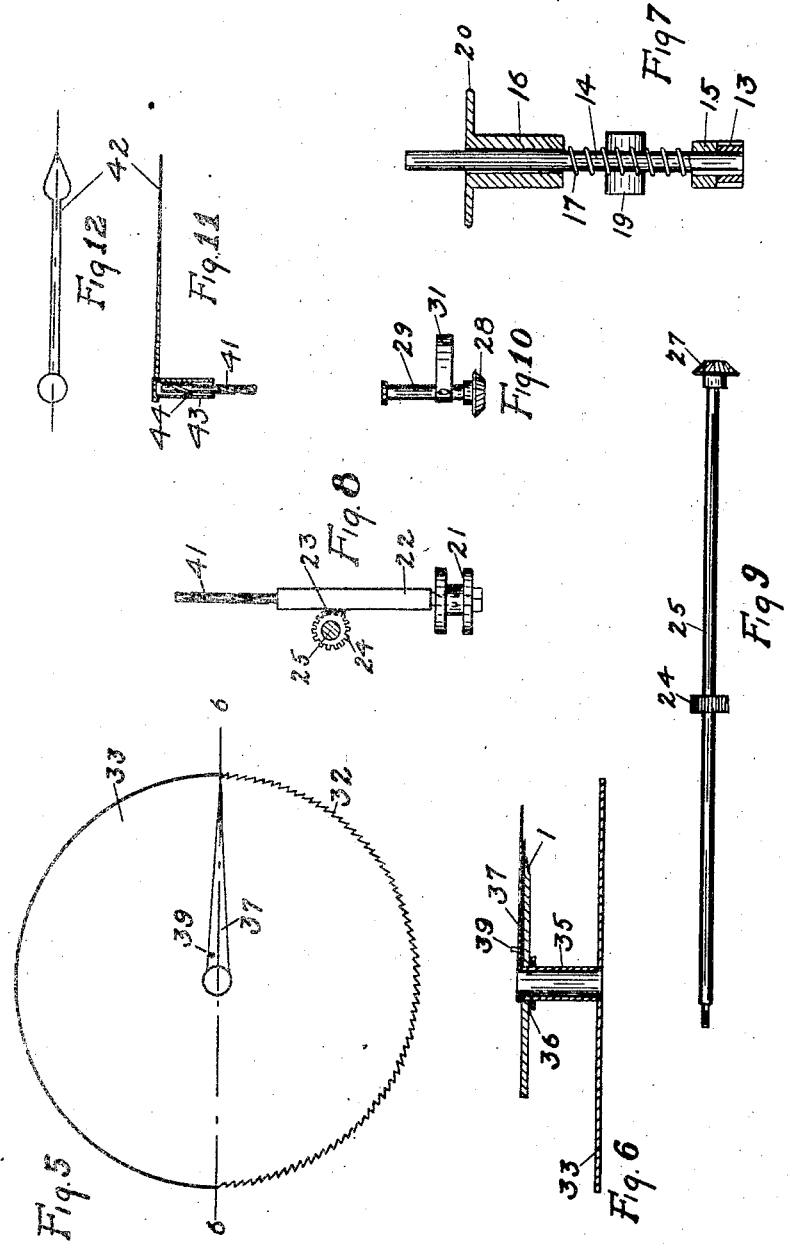

UNITED STATES PATENT OFFICE.

LESTER C. DUNCAN, OF LENIA, IDAHO.

SPEED-INDICATOR.

1,092,828.

Specification of Letters Patent.

Patented Apr. 14, 1914.

Application filed October 29, 1912. Serial No. 728,434.

*To all whom it may concern:*

Be it known that I, LESTER C. DUNCAN, a citizen of the United States, residing at Lenia, in the county of Bonner and State of Idaho, have invented new and useful Improvements in Speed - Indicators, of which the following is a specification.

My invention relates to improvements in speed indicators especially adapted for use in connection with automobiles, although the device of my invention is not limited to this particular utility.

One of the objects of my invention is to provide a maximum or auxiliary index which will indicate the maximum speed attained by the vehicle at any time throughout the trip, and which will show the maximum speed attained even after the vehicle has come to a position of rest and preferably, until the vehicle is again started. In accordance with my invention, the maximum speed index will return toward, or to a zero position, immediately upon the restarting of the vehicle.

My invention will be more fully described in connection with the accompanying drawings and will be more particularly pointed out in and by the appended claims.

In the drawings:—Figure 1 is a face view of a speed indicator embodying one form of my invention. Fig. 2 is a vertical sectional view thereof on line 2—2 of Fig. 1. Fig. 3 is a plan view of a multiplying speed gear train, forming a part of the device shown. Fig. 4 is a sectional view on line 4—4 of Fig. 1. Fig. 5 is a face view of the maximum index and a ratchet wheel or disk to which said index is connected. Fig. 6 is a sectional view thereof on line 6—6 of Fig. 5. Fig. 7 is a longitudinal vertical section of a governor shaft, and a part of the governor employed in the device of my invention. Fig. 8 is a view in elevation, with parts in section, of a shifting rod adapted to be actuated by the governor. Fig. 9 is a view in elevation of one of the shafts. Fig. 10 is a view in elevation of a spring pawl with an operating gear therefor. Fig. 11 is a sectional view on line 11—11 of Fig. 12 illustrating one form of speed pointer. Fig. 12 is a plan view of the pointer shown in Fig. 11.

Like characters of reference designate similar parts throughout the different figures of the drawings.

As illustrated, my invention includes a casing 1 in the lower portion of which is suitably mounted a shaft 2 adapted for connection with the usual flexible transmission shaft of a vehicle in a manner to be operated while the vehicle is running. The shaft 2 operates a multiplying gear train which consists of a gear 3, on shaft 2, which meshes with a gear 4 on shaft 5 which latter carries a gear 6. The gear 6 meshes with a gear 7 on shaft 8 which latter carries a gear 9 meshing with gear 10. Gear 10 is mounted on shaft 11 which also carries a gear 12 meshing with gear 13 on a governor shaft 14.

The governor shaft 14 carries a rigidly mounted sleeve 15 between which and a slidably mounted sleeve 16, is interposed an expansible coil spring 17. The sleeves 15 and 16 are connected by longitudinally disposed resilient spring governor arms, indicated at 18, and carrying governor elements 19, as illustrated. The normal action of spring 17 is to maintain the sleeve 16 in the position shown in Fig. 2. The sleeve 16 carries a disk 20 which rotatively engages a revoluble double flanged collar 21, mounted on the shifting rod 22. The shifting rod 22 is of polygonal cross section and is non-rotatively and longitudinally shiftably mounted so that when the sleeve 16 moves up and down on the governor shaft 14 the disk 20 will impart a longitudinal shifting movement to the rod 22. As illustrated in Fig. 8, the rod 22 is provided with a relatively short rack 23 adapted to engage the gear 24 mounted on shaft 25. The shaft 25 is mounted in bearings 26 and is provided with a bevel gear 27, on one end, which meshes with a bevel gear 28 on a shaft 29. The shaft 29 is rotatively mounted at 30 and carries a flexible spring pawl 31 adapted to engage the ratchet teeth 32 of the maximum speed index disk 33. A spring 34 normally acts to revolve the shaft 29 in a direction to engage the pawl 31 with the teeth 32. The disk 33 is provided with a sleeve 35 having a suitable bearing in the casing 1 at 36. On the upper end of the sleeve 35 is rigidly mounted the maximum or auxiliary index 37 which is moved over the graduated dial 38. The ratchet teeth 32 correspond in size to the graduations of the dial 38. A pin 39 extends upwardly from the maximum index 37, as shown in Fig. 6 hereinafter fully appearing. A spiral spring 40, secured at one end of the casing 1 and at its other end to the disk 33, normally tends to restore the disk 33, and the maximum index 37 which is rigidly connected with the disk 33, to a zero position.

The shiftable rod 22 is provided with a worm extension 41 which extends upwardly through the sleeve 35. A speed indicator 42, provided with a cap sleeve 43, is operatively connected with the worm extension 41 by having a sleeve 43 disposed thereover. The cap sleeve 43 is provided with a pin 44 which engages the worm groove in the extension 41 so that when the rod 22 is shifted longitudinally the speed indicator 42 will be moved over the dial 38, in accordance with the direction in which the rod 22 is shifted.

The speed indicator 42 is disposed over and above the index 37 and lies at one side of the pin 39 so that when the speed indicator 42 is moved in a clockwise direction it will engage the pin 39 and move the maximum index in a clockwise direction as long as the speed indicator 42 is moving in such direction. If the speed indicator 42 should be moved backwardly in a contra-clockwise direction then the maximum index 37 would be held in a position to indicate the maximum speed attained, by the pawl 31 engaging the teeth 32.

The device of my invention operates as follows:—Assuming that the vehicle is at rest and that the parts are in a position shown with the index 37 and indicator 42 in a zero position, and the gear 24 engaging the rack 23, it will be seen that when the vehicle is started the shaft 2, through the gearing, will rotate the governor so as to lower the sleeve 16 under centrifugal action of the governor elements 19, against the spring 17. The disk 20 will carry the flanged sleeve 21 with the rod 22 downwardly so that the rack 23 will be below and out of mesh with the gear 24. This movement of the rod 22 will impart a slight rotation to the gear 24 in a contra-clockwise direction and such contra-clockwise movement of the shaft 25 will impart a clockwise movement to the shaft 29 momentarily releasing the pawl 31 from the teeth 32. However, inasmuch as the disk 33 will, at that time, be at a zero position, this slight disengagement of the pawl 31 from the teeth 32 will not in any way affect the operation or cause any movement under action of spring 40 as disk 33 will be limited in movement by suitably placed stops so that it cannot move beyond a zero position, in one direction. Immediately after the rack 23 has become disengaged from the gear 24, then the spring 34 will rotate the shaft 29 and reëngage the pawl 31 with the teeth 32. It will be understood that the shafts 29 and 25 can be moved idly and freely after the rack 23 is lowered out of engagement with the gear 24. Furthermore, the rack 23 will not be disengaged from the gear 24 until the vehicle has attained a speed somewhat beyond a minimum speed and somewhat above the lowest normal speed of the vehicle. As the vehicle proceeds under varying speed the speed of the shaft 2 will vary and the speed of the governor will vary and movement will be imparted, as hereinbefore described, to the speed indicator 42 to vary its position on the dial 38. The speed indicator 42 will carry the maximum index 37 along with it to the highest graduation attained by the indicator 42. During the travel of the speed indicator 42 it will be understood that pawl 31, under the action of spring 34, will engage the teeth 32 and permit movement of the disk 33 in a clockwise direction but will prevent movement of the disk 33 in a contra-clockwise direction.

Assuming that the vehicle has reached its destination and has been brought to a position of rest, the governor will then assume its initial position and the spring 17 will raise the rod 22, to the sleeve 16 and disk 20, and the indicator 42 will be brought back to a normal position, as shown in full lines in Fig. 1. The maximum indicator will not have its position altered but will remain at the position shown in dotted lines, in Fig. 1, to indicate the maximum speed at which the vehicle has been propelled at any given time during the trip. The return of the rod 22 to its initial position will engage the rack 23 with the gear 24 causing a clockwise movement of the shaft 25 and a contra-clockwise movement of the shaft 29 so as to force the pawl 31 in closer engagement with teeth but inasmuch as the pawl is of yielding material it will permit this additional movement of the shaft 29. Thus the maximum index will remain at the indication of highest speed as long as the vehicle remains in a position of rest. As soon as the vehicle is again started the governor will lower the rod 22 and rotate the shaft 25 in a contra-clockwise position thereby imparting a clockwise direction of movement to the shaft 29 and disengaging the pawl from the teeth 32. The spring 40 will restore the pawl to a zero position or toward a zero position until the pin 39 engages the speed indicator 42 whereupon the index 37 will again follow the clockwise movement of the indicator 42.

While I have herein shown and described one specific form of my invention I do not wish to be limited thereto except for such limitations as the claims may import.

I claim:—

1. A speed indicator for vehicles comprising in combination, a graduated dial, a speed indicator movable over said dial, a maximum speed index connected with said indicator for advancement therewith only in a direction toward the highest indication on the dial, shiftable means for moving said indicator, governor mechanism adapted to be operated by the vehicle and operatively connected with said means, a ratchet wheel connected to move with said index, a pawl engaging said ratchet wheel for retaining said index in its advanced position, and a device operated by said mechanism for releasing said pawl, substantially as described.

2. A speed indicator for vehicles comprising in combination, a graduated dial, a rotatable speed indicator movable over said dial, a rotatable maximum speed index connected with said indicator for advancement therewith only in a direction toward the highest indication on said dial, a longitudinally shiftable and non-rotatable rod means for advancing said indicator, governor mechanism operable from the vehicle for shifting said rod means, a rotatable ratchet wheel connected to move with said index, a pawl engaging said ratchet wheel for retaining said index in its advanced position, and a device operated by said rod means for releasing said pawl, substantially as described.

3. A speed indicator for vehicles comprising in combination, a graduated dial, a rotatable speed indicator movable over said dial, a rotatable maximum speed index connected with said indicator for advancement therewith only in a direction toward the highest indication on said dial, a longitudinally shiftable and non-rotatable rod means for moving said indicator, governor mechanism operable by the vehicle for shifting said rod means, a rotatable ratchet wheel connected to move with said index, a spring normally acting to return said ratchet wheel and index to a zero position, a resilient pawl engaging said ratchet wheel for retaining said index in its advanced position, and a gearing device operated by said rod means for releasing said pawl, substantially as described.

4. A speed indicator for vehicles comprising in combination, a graduated dial, a speed indicator movable over said dial, a governor controlled mechanism driven by the vehicle for moving said indicator in opposite directions to indicate the running speed of the vehicle, a maximum speed index adapted to be advanced by said indicator to the highest speed indicated thereby, ratchet means for retaining said index in its maximum position, and a device operated by said mechanism for actuating part of said ratchet means to permit return of said index to a zero position, substantially as described.

5. A speed indicator for vehicles comprising in combination, a graduated dial, a speed indicator movable over said dial, governor controlled mechanism driven by the vehicle for moving said indicator in opposite directions to indicate the running speed of the vehicle, a maximum speed index adapted to be advanced by said indicator to the highest speed indicated thereby, means for retaining said index in its maximum speed indicating position, and a device operated by said mechanism for actuating part of said means to permit return of said index to a zero position, substantially as described.

6. A speed indicator for vehicles comprising in combination, a graduated dial, a speed indicator movable over said dial, a maximum speed index adapted to be advanced by said indicator to the highest speed indicated thereby, means for retaining said index in its maximum speed indicating position, and governor controlled mechanism driven by the vehicle for operating said speed indicator and actuating said means to permit return of said index to a zero position, substantially as described.

7. A speed indicator for vehicles comprising in combination, a graduated dial, an indicator movable over said dial for indicating the running speed of the vehicle, a maximum speed index connected with said indicator to be advanced thereby to the highest speed indicated by said indicator, means driven by the vehicle for operating said indicator, means for checking said index against return movement toward a zero position comprising a ratchet wheel connected with said index, a spring controlled resilient pawl engaging said ratchet wheel, and gearing operated by said vehicle driven means for engaging and releasing said pawl with and from said ratchet wheel, substantially as described.

8. A speed indicator for vehicles comprising in combination, a graduated dial, a rotatable indicator movable over said dial for indicating the running speed of the vehicle, a rotatable maximum speed index connected with said indicator to be advanced thereby to the highest speed indicated by the indicator, a longitudinally shiftable non-rotatable rod having a worm extension, said indicator having means engaging said worm extension, means driven by the vehicle for shifting said rod longitudinally to operate said indicator, and means for checking said index against return to a zero position, substantially as described.

In testimony whereof I affix my signature in the presence of two witnesses.

LESTER C. DUNCAN.

Witnesses:
W. A. GUHR,
R. E. ABBOTT.